(12) United States Patent
Masuda et al.

(10) Patent No.: US 7,903,387 B2
(45) Date of Patent: Mar. 8, 2011

(54) CAPACITOR HAVING MICROSTRUCTURES

(75) Inventors: Hidetoshi Masuda, Takasaki (JP);
Masaru Kurosawa, Takasaki (JP);
Kotaro Mizuno, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 393 days.

(21) Appl. No.: 12/188,177

(22) Filed: Aug. 7, 2008

(65) Prior Publication Data
US 2009/0052110 A1    Feb. 26, 2009

(30) Foreign Application Priority Data

Aug. 20, 2007    (JP) .................................. 2007-214202

(51) Int. Cl.
*H01G 4/005*    (2006.01)
(52) U.S. Cl. ...................... 361/303; 361/305; 361/321.1; 361/312; 361/306.3; 361/313
(58) Field of Classification Search .................. 361/303, 361/305, 311–313, 321.1, 321.2, 306.1, 306.3, 361/321.4, 301.1, 301.4
See application file for complete search history.

(56) References Cited

U.S. PATENT DOCUMENTS

| | | | | |
|---|---|---|---|---|
| 6,333,857 B1 * | 12/2001 | Kanbe et al. | .................. | 361/792 |
| 6,370,013 B1 * | 4/2002 | Iino et al. | ................... | 361/306.3 |
| 6,574,090 B2 * | 6/2003 | Appelt et al. | ................. | 361/312 |
| 6,795,295 B2 * | 9/2004 | Murakami et al. | ......... | 361/306.3 |
| 6,809,268 B2 * | 10/2004 | Hayashi et al. | ............... | 174/260 |
| 7,742,276 B2 * | 6/2010 | Hsu et al. | ................... | 361/306.2 |

FOREIGN PATENT DOCUMENTS

| | | |
|---|---|---|
| JP | S61-29133 B2 | 7/1986 |
| JP | H09-045577 A1 | 2/1997 |
| JP | 2003-249417 A1 | 9/2003 |
| JP | 2006-512787 A1 | 4/2006 |
| WO | WO2004/075218 A1 | 9/2004 |

* cited by examiner

*Primary Examiner* — Nguyen T Ha
(74) *Attorney, Agent, or Firm* — Law Office of Katsuhiro Arai

(57) ABSTRACT

A capacitor element includes a pair of conductor layers, a plurality of generally tube-shaped dielectric substances, a first electrode outside the dielectric substances and second electrodes in the insides thereof, and insulation caps for insulating the first electrode from the conductor layer, wherein an electrode material is filled in gaps of a structure of an oxide base material resulting from anodic oxidation of a metal, and then, the structure is removed and replaced by a high permittivity material.

18 Claims, 11 Drawing Sheets

[Fig. 1]
(A)
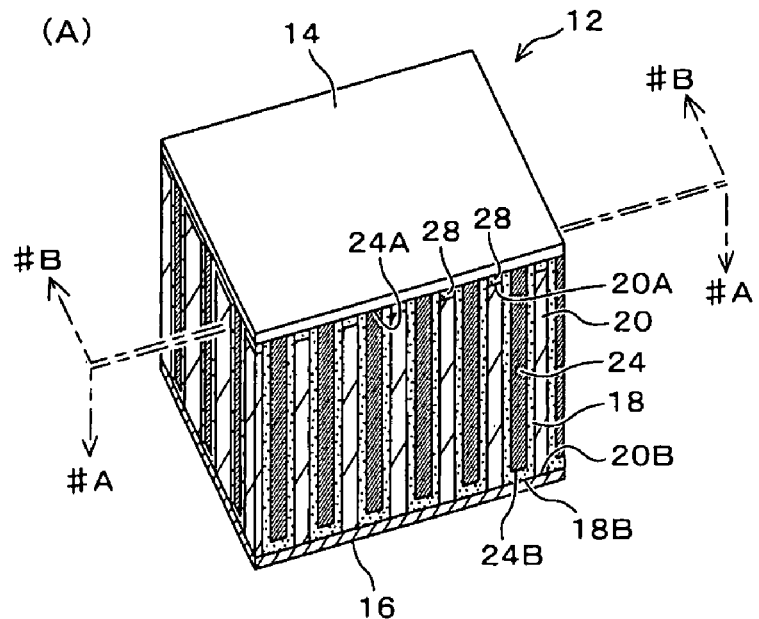
(B)
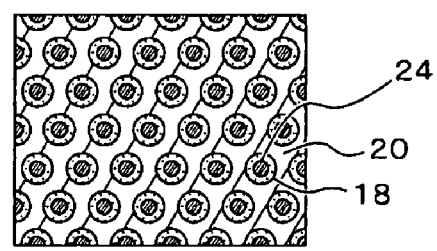
(C)
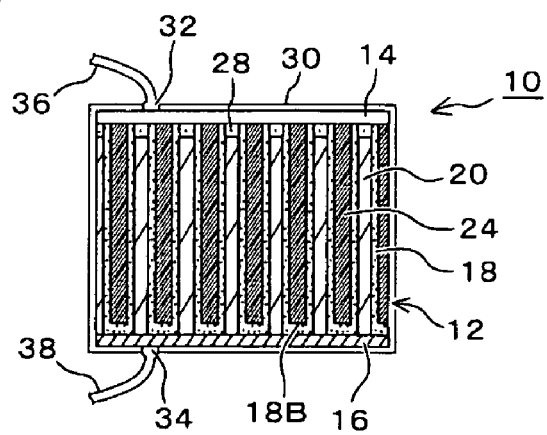

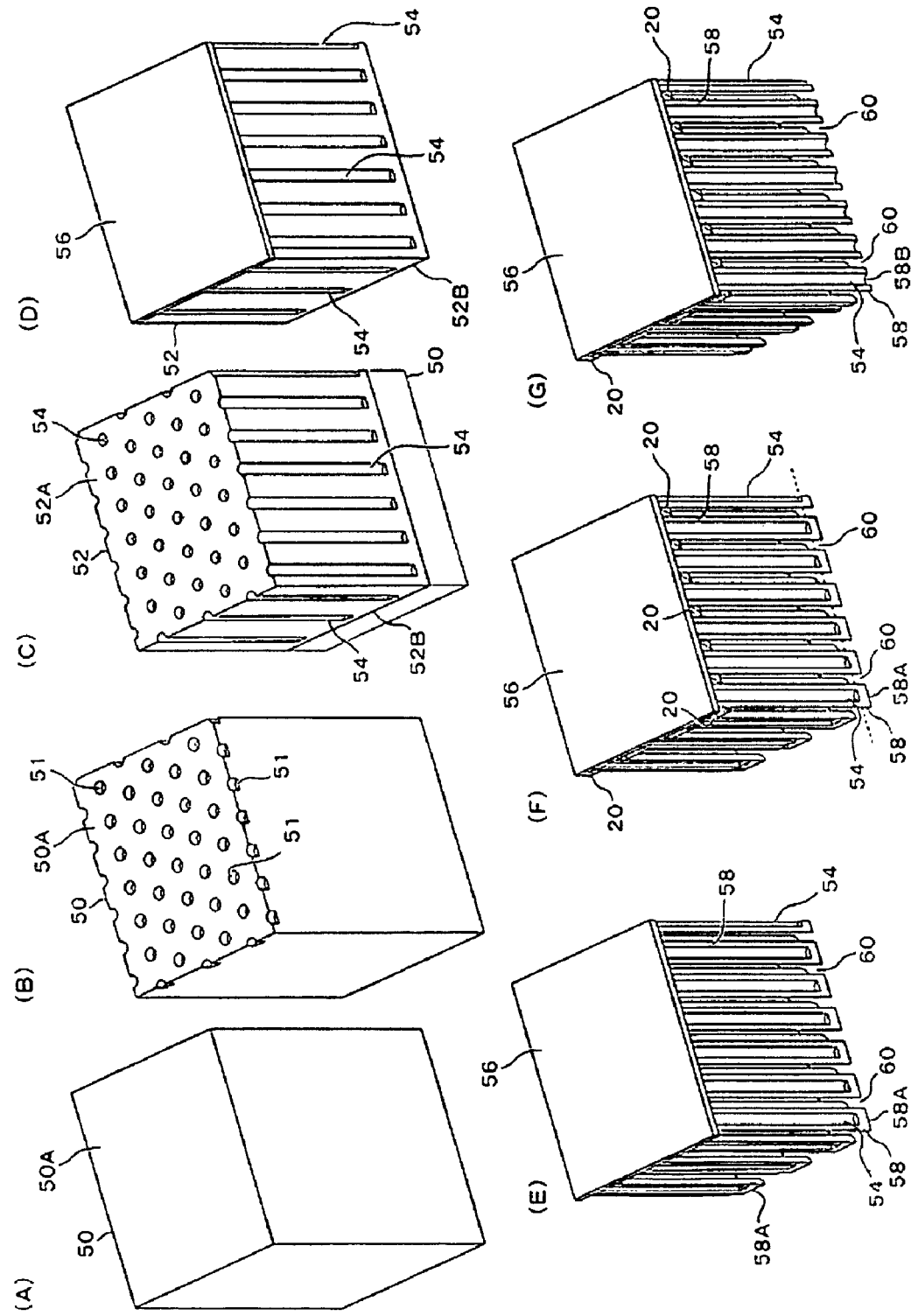
[Fig. 2]

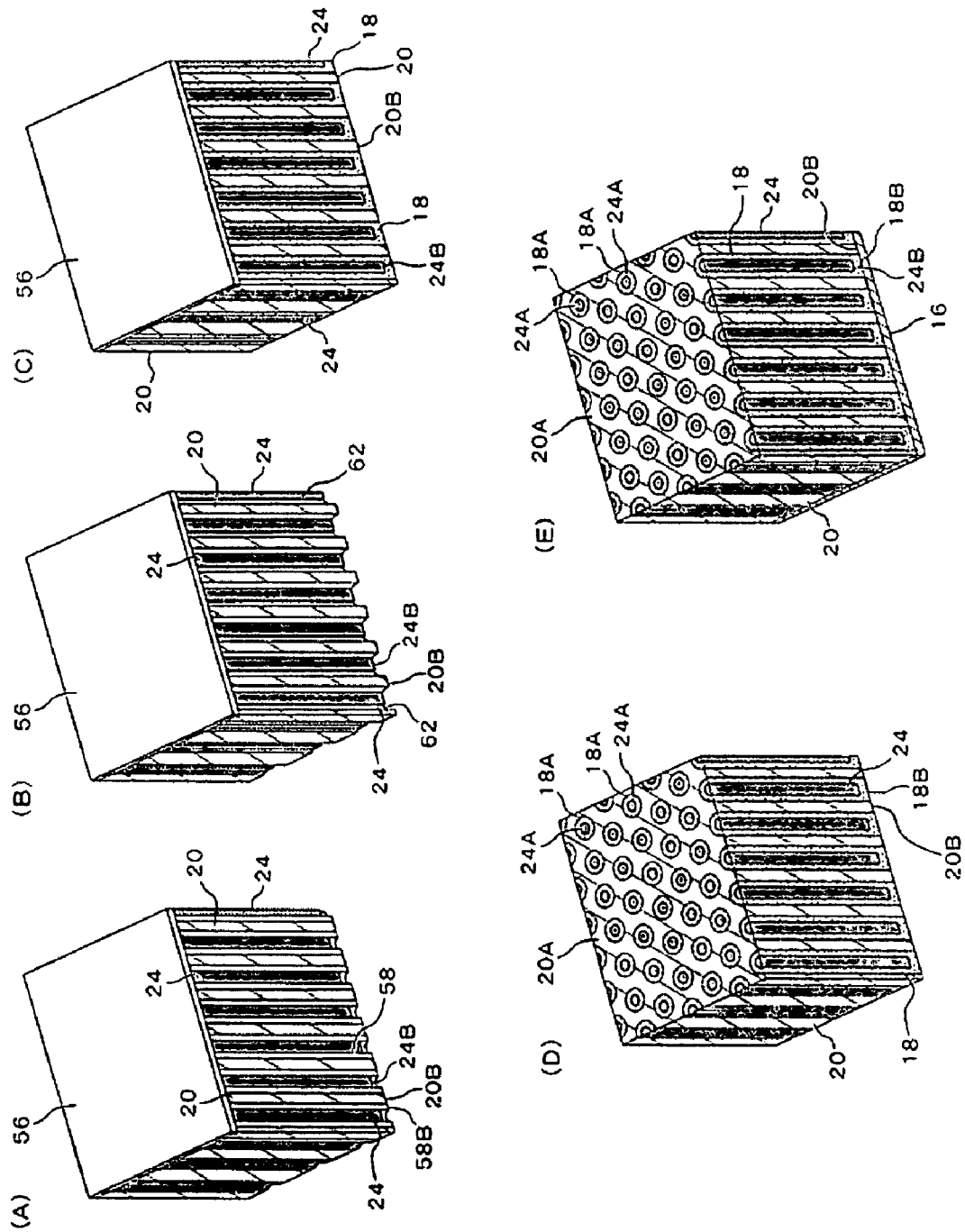
[Fig. 3]

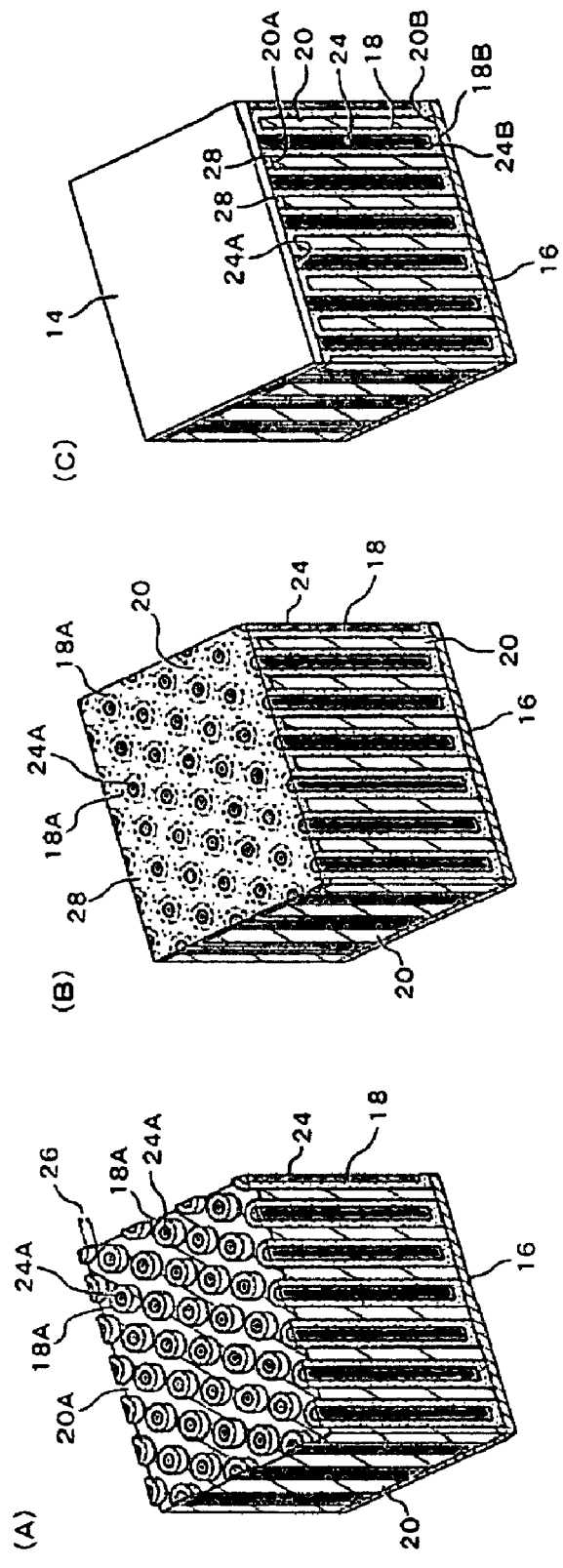
[Fig. 4]

[Fig. 5]
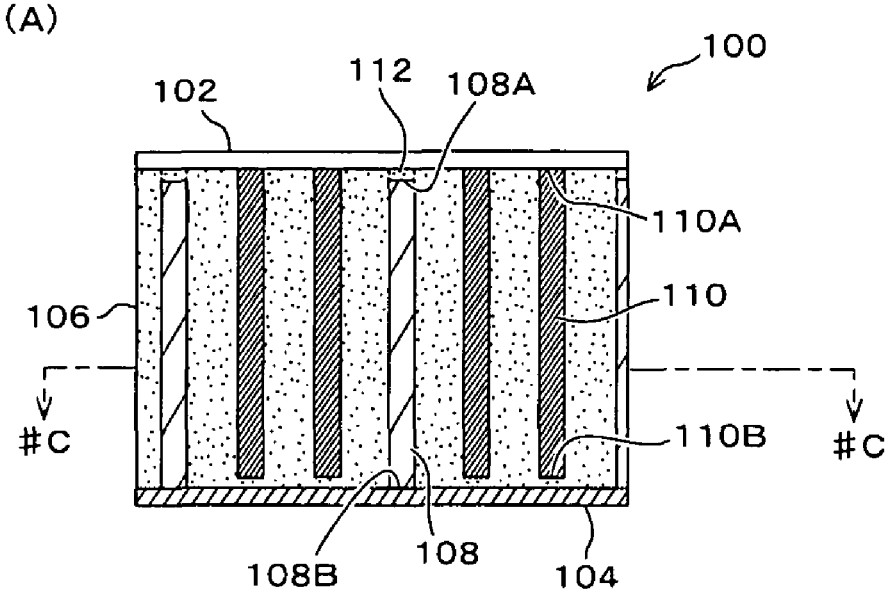
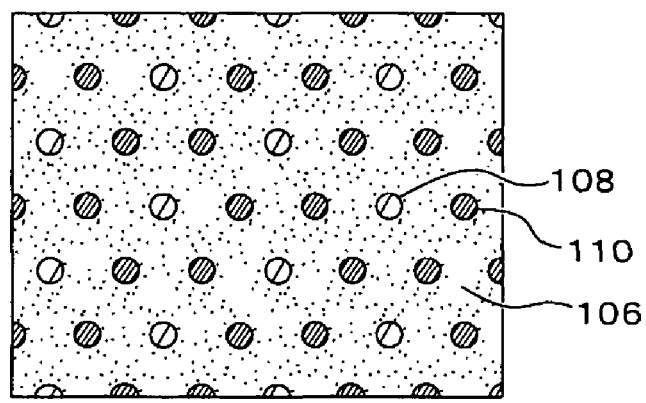

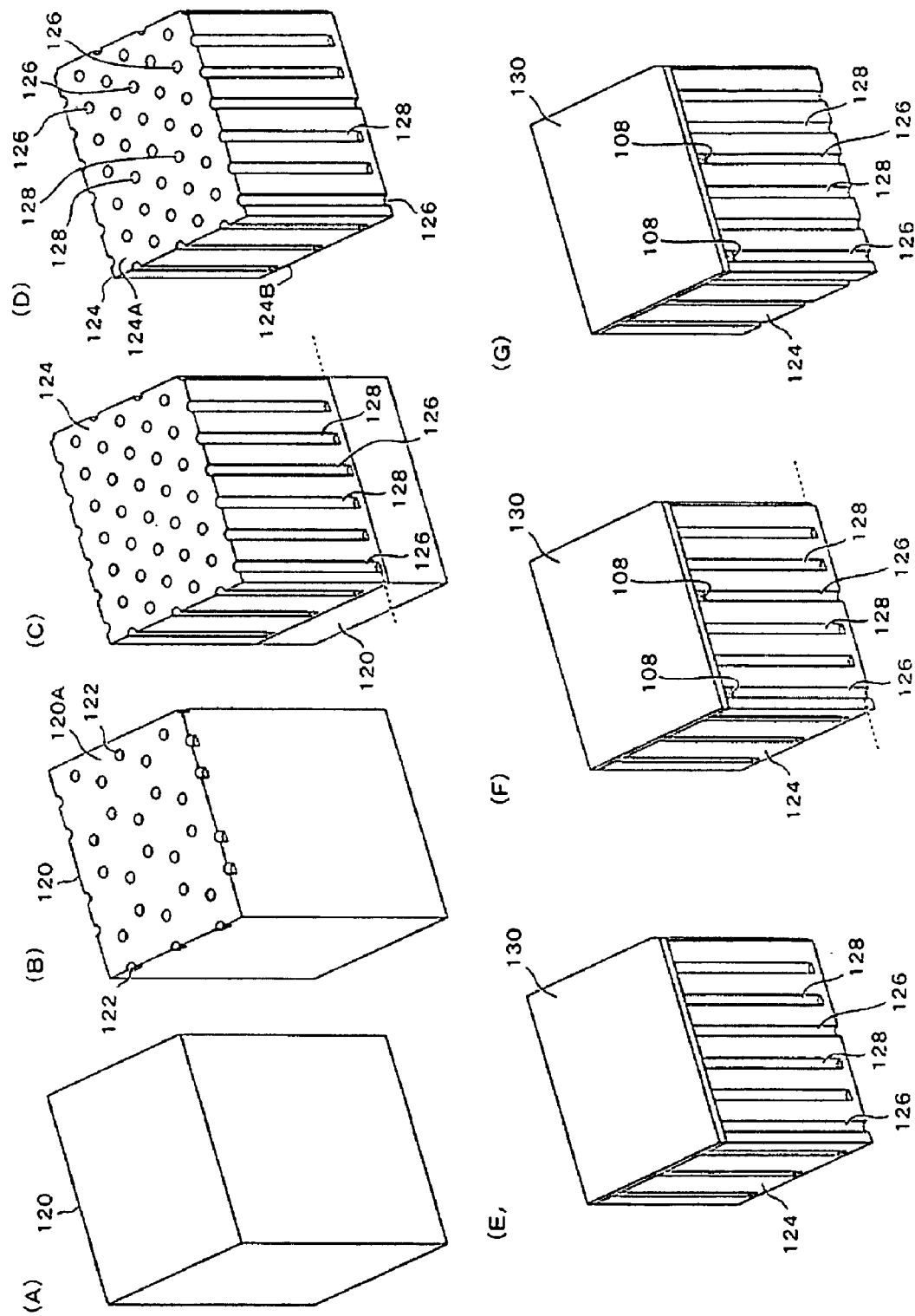

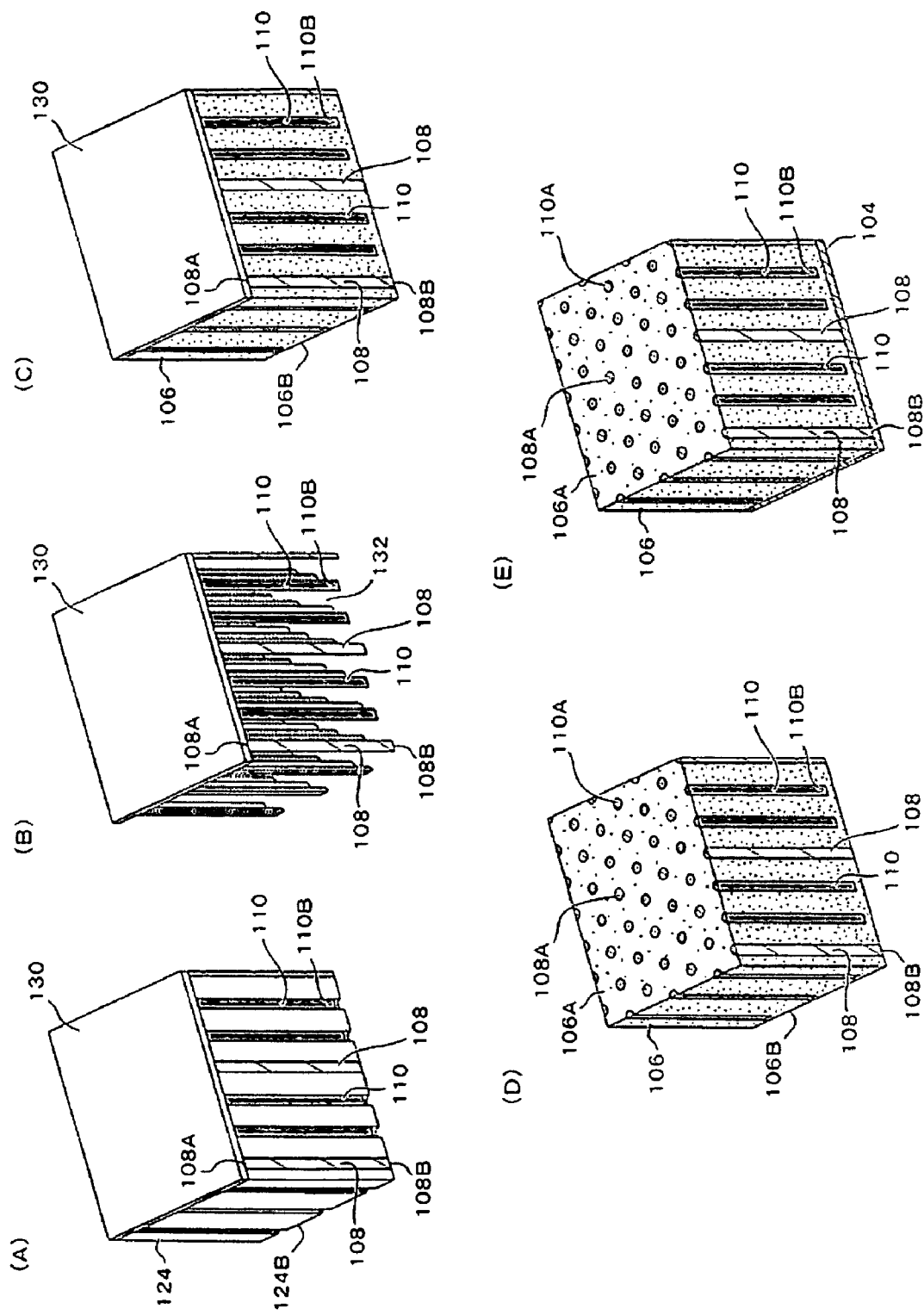
[Fig. 7]

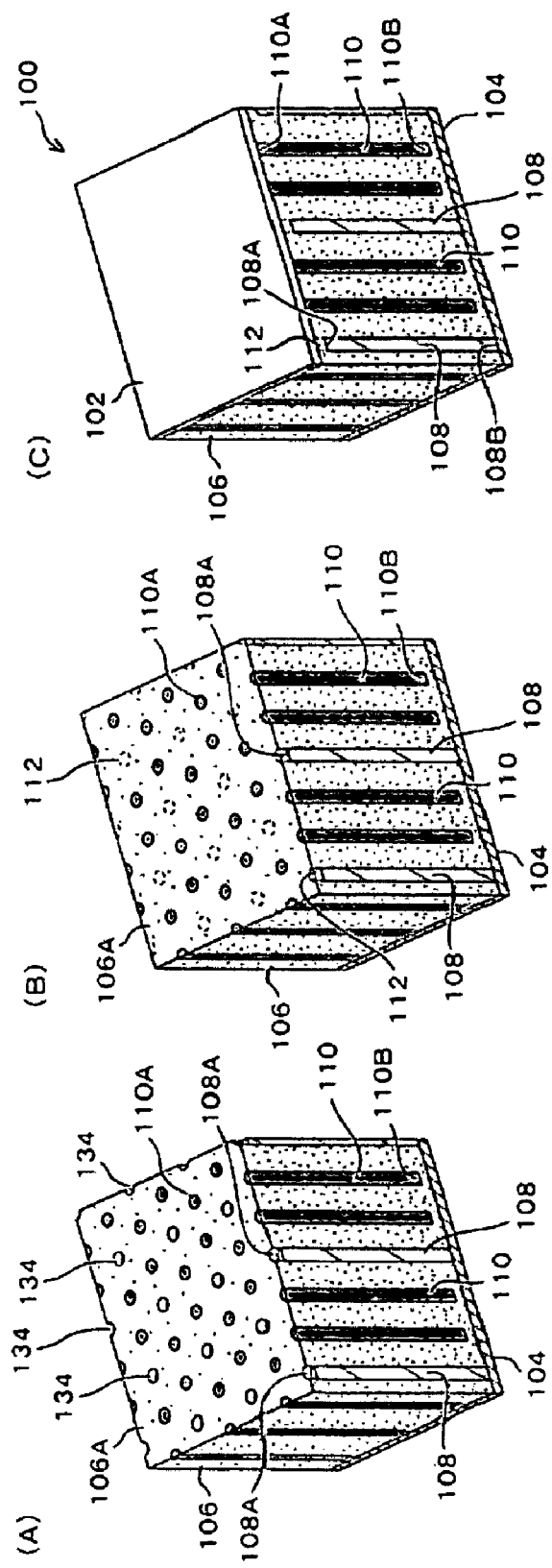

[Fig. 9]
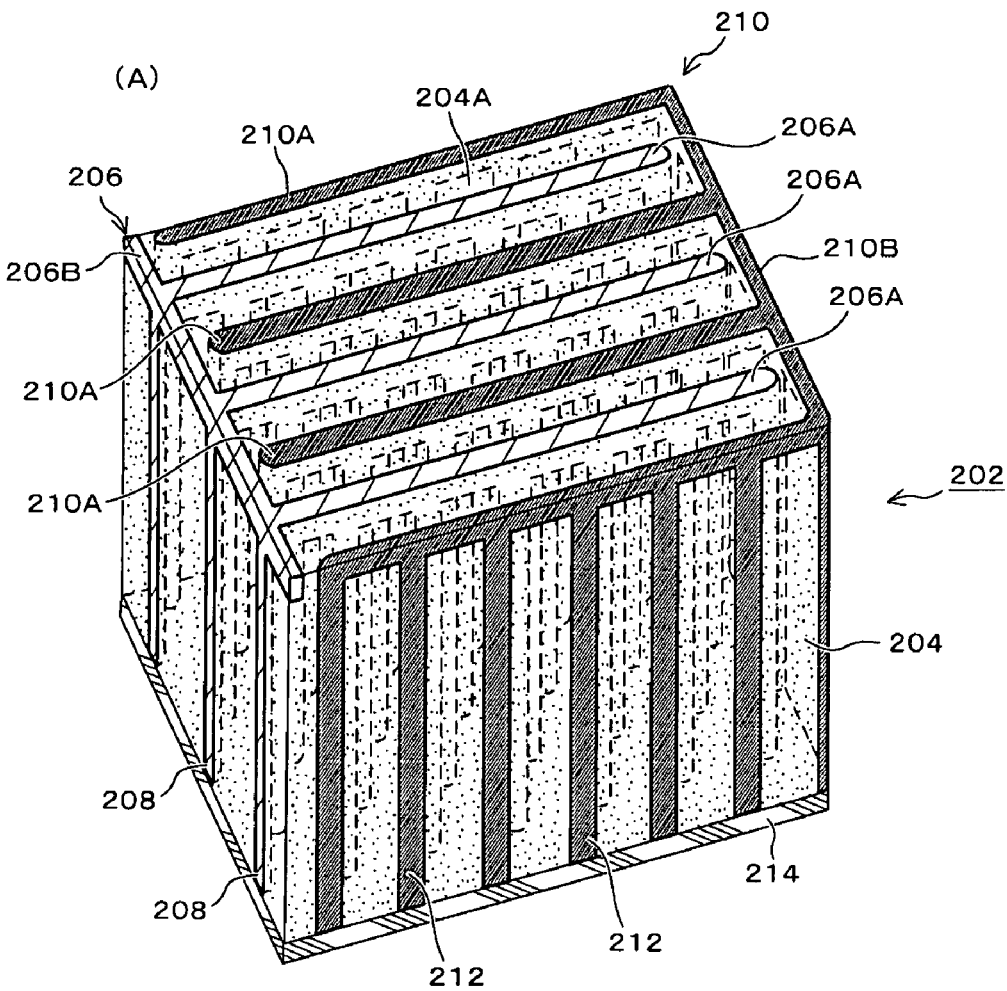
(A)
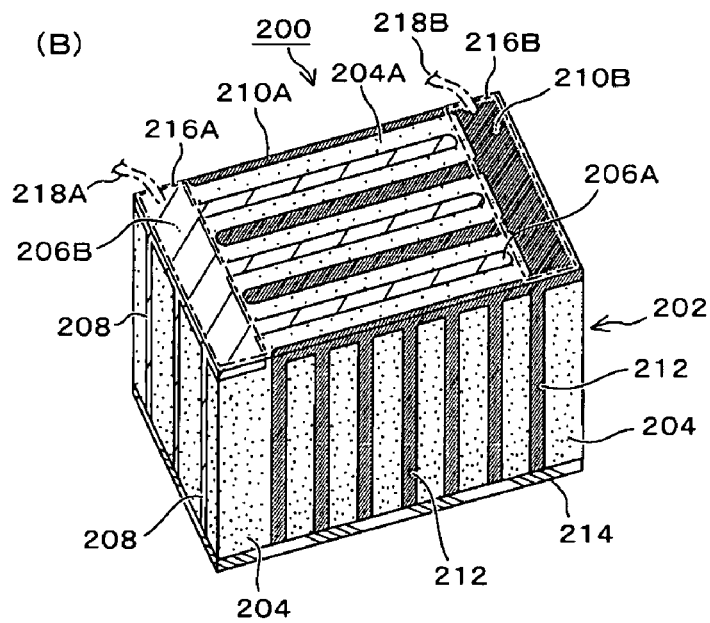
(B)

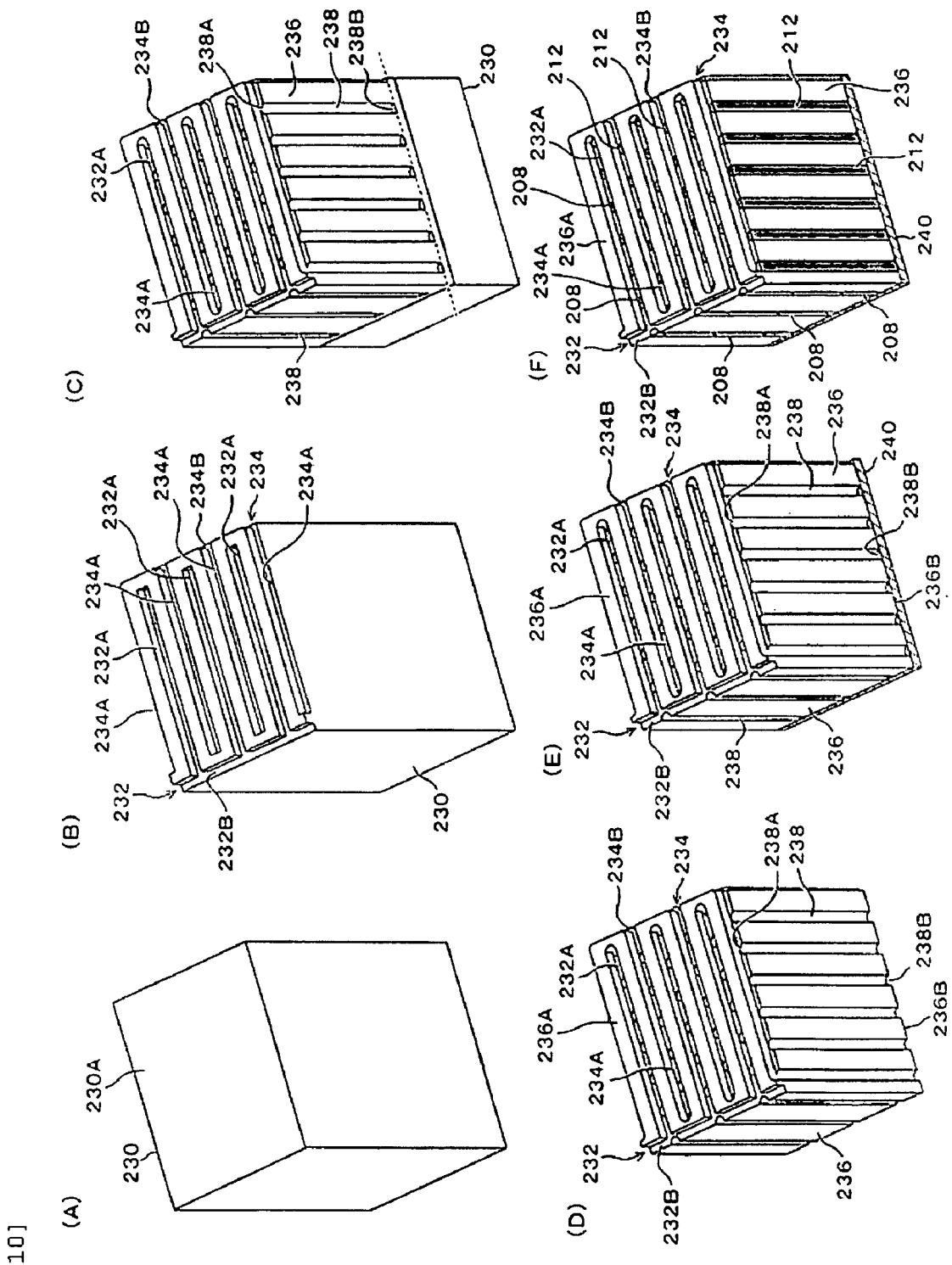
[Fig. 10]

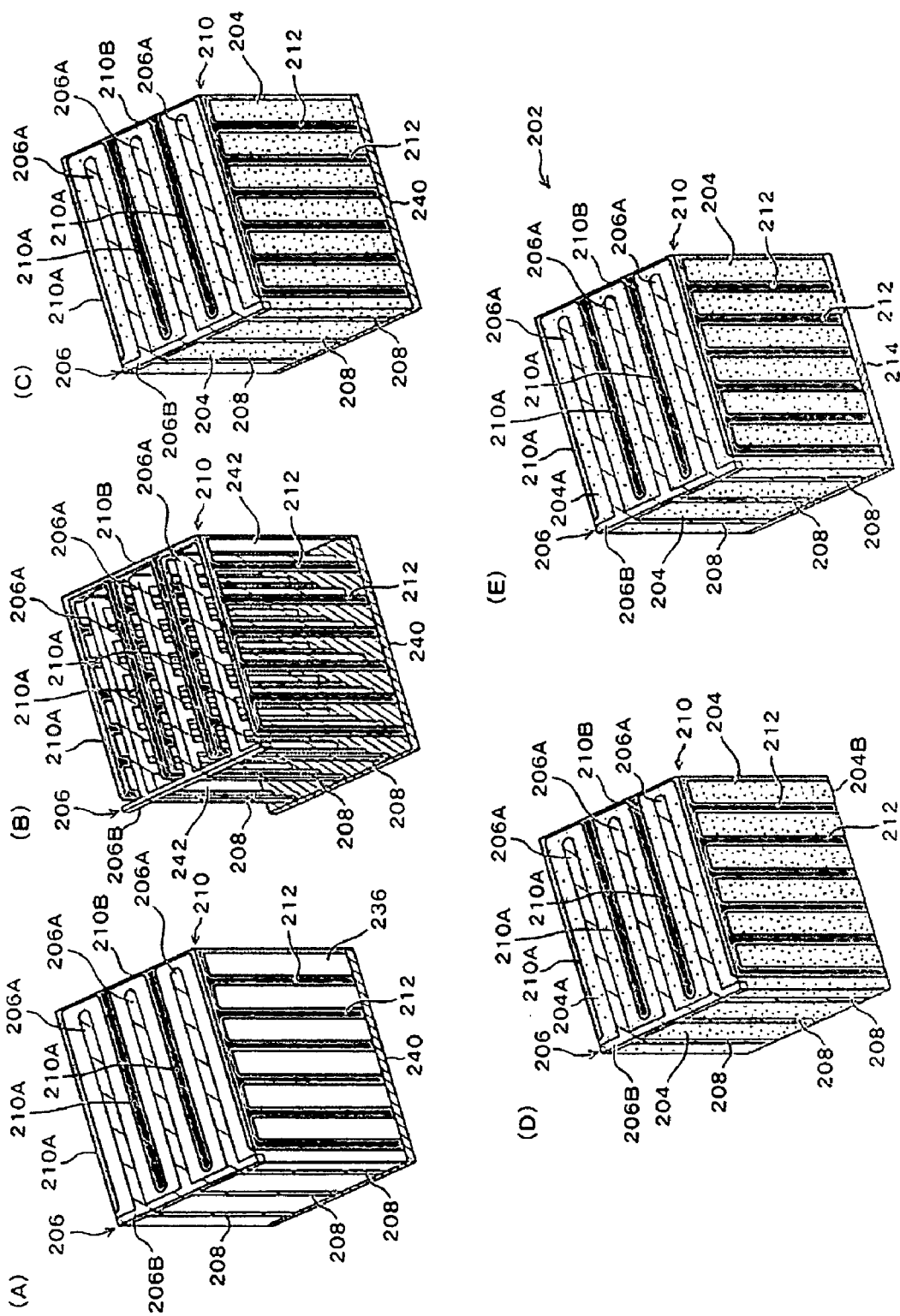
[Fig. 11]

CAPACITOR HAVING MICROSTRUCTURES

BACKGROUND OF THE INVENTION

1. Field of the Invention

The present invention relates to a capacitor and a manufacturing method thereof. More particularly, it relates to the improvement of the capacitance density of a capacitor, reduction of ESL (Equivalent Series Inductance), the improvement of the arbitrariness of the electrode metal and the dielectric material in the configuration of a capacitor, and simplification of the manufacturing process of a capacitor.

2. Description of Related Art

As currently widely used capacitors, Al electrolytic capacitors and multi-layer ceramics capacitors are known. With Al electrolytic capacitors, an electrolyte is used. This entails a difficult problem that a configuration for preventing solution leakage must be considered, or other difficult problems. Whereas, multi-layer ceramics capacitors require sintering. This entails a difficult problem that design allowing for distortion due to a difference in thermal contraction between the electrode and the dielectric substance or the like must be adopted, and other difficult problems. Examples of a technology for implementing a compact large-capacitance capacitor include a grain boundary-insulated semiconductor ceramic capacitor shown in JP-B-61-29133, a capacitor structure and a manufacturing method thereof shown in JP-A-2003-249417.

In JP-B-61-29133, there is disclosed a capacitor which includes a semiconductor grain boundary insulated dielectric substance porcelain including a plurality of through holes extending toward the opposing end faces, electrodes for external connection respectively provided on the opposing end faces of the dielectric substance porcelain, and electrode bodies for capacitance including a high melting point metal inserted through respective through holes of the dielectric substance porcelain. The electrode bodies for capacitance are conductively connected, adjacent ones to mutually different ones of the electrodes for external connection, respectively. Whereas, JP-A-2003-249417 discloses one example of a method for obtaining a capacitor structure body. This method includes the following steps: a thin film formation processing is performed by using a porous substrate obtained from anodic oxidation of a substrate, thereby to form a first electrode including a large number of pillar-shaped bodies regularly formed on the surface of a capacitor substrate; a dielectric thin film is formed on the first electrode so as to cover the outsides of the pillar-shaped bodies; and a second electrode is formed on the surface of the dielectric thin film so as to cover the outsides of the pillar-shaped bodies.

Whereas, in JP-A-09-45577, there is disclosed a method for manufacturing a multi-layer electronic device configured such that a plurality of internal electrodes are disposed so as to oppose each other via a ceramic layer. The method includes a step of forming a metal film on a substrate, a step of forming a prescribed electrode pattern to be internal electrodes by trimming the metal film with photolithography, and a step of forming a ceramic to be a functional element part with a dry plating method in the gap part of the electrode pattern. Further, in JP-T-2006-512787 (the term "JP-T" as used herein means a published Japanese translation of a PCT patent application), there is disclosed a capacitor which includes a first electrode formed on a semiconductor substrate, including a first via and a metal layer connected to the first via, and electrically connected to a first region of the semiconductor substrate; a second electrode formed on the semiconductor substrate, including a second via and a metal layer connected to the second via, and electrically connected to a second region of the semiconductor substrate; and a high-permittivity dielectric substance disposed between the first electrode and the second electrode.

However, the background art described up to this point has the following problems. First, with the technology according to JP-B-61-29133, a semiconductor grain boundary insulated dielectric substance porcelain having a plurality of through holes is used as a dielectric layer, and it is configured such that electrode bodies for capacitance are selectively inserted through the respective through holes. However, micromachining thereof is difficult, which entails a problem that large capacitance due to an increase in area is difficult to attain. Whereas, with the technology according to JP-A-2003-249417, adhesion of the electrode material to the porous substrate used as a mask, an enlargement of the holes due to etching of the porous substrate itself, and the like occur. Therefore, it is difficult to obtain pillar-shaped bodies with a uniform cross sectional shape and a desirable shape. Further, when the pillar-shaped bodies increase in height, a difference in film thickness tends to occur in a dielectric thin film to be formed subsequently. This entails a problem that it is difficult to attain a large capacitance by an increase in height of pillar-shaped bodies.

With the technology according to JP-A-9-45577, the electrode is formed by etching of the metal film formed on the substrate. Therefore, it is difficult to increase the aspect ratio in a z direction (direction of thickness). Whereas, also with the technology according to JP-T-2006-512787, the electrode is formed by etching. Therefore, it is difficult to increase the aspect ratio in a z direction. Thus, unfavorably, with the electrode forming technology by etching, it is difficult to increase the aspect ratio in a z direction of the electrode part, and to increase the area defining the capacitance.

SUMMARY OF THE INVENTION

The present invention was made with attention paid to the foregoing points. It is an object of one or more embodiment of the invention to provide a capacitor which can improve the capacitance density, can improve the arbitrariness of the electrode metal and the dielectric material, and/or can simplify the manufacturing process, while being compact, and, in another aspect, to provide a manufacturing method thereof. Further, it is another object of one or more embodiments of the invention to provide a capacitor capable of reducing ESL, and, in another aspect, to provide a manufacturing method thereof.

In accordance with a first aspect of the invention, there is provided a capacitor, which includes: a pair of conductor layers opposing each other at a prescribed distance; a plurality of generally tube-shaped dielectric substances being generally orthogonal to the conductor layer, and being connected at their respective opposite ends to internal main surfaces of the pair of the conductor layers, and being formed of a high permittivity material; a first electrode being disposed between the plurality of the dielectric substances, and being connected to one conductor layer at one end thereof, and being insulated from the other conductor layer at the other end thereof; and a plurality of generally pillar-shaped second electrodes being disposed in the plurality of the dielectric substances, and being connected to the other conductor layer at respective one ends thereof, and being insulated from the one conductor layer at respective other ends thereof. One of main embodiments thereof is a capacitor, wherein the dielectric substances are disposed at apexes of hexagons forming a honeycomb structure, and centers thereof in shape seen from a cross section generally parallel with the conductor layers. As a result, the foregoing objects are implemented.

Further, in accordance with a second aspect of the invention, there is provided a capacitor, which includes: a pair of conductor layers opposing each other at a prescribed distance; a dielectric layer being provided between the pair of the conductor layers, and being formed of a high permittivity material; generally pillar-shaped first electrodes being provided in some holes out of a plurality of holes penetrating through the dielectric layer in the direction generally orthogonal to the pair of the conductor layers, and being connected to the one conductor layer at respective one ends thereof, and being insulated from the other conductor layer at the other ends thereof; and generally pillar-shaped second electrodes being provided in the residual holes out of the plurality of the holes, and being connected to the other conductor layer at respective one ends thereof, and being insulated from the one conductor layer at the other ends thereof. One of main embodiments thereof is a capacitor, wherein either one electrodes of the first or second electrodes are disposed at apexes of hexagons forming a honeycomb structure, and the other electrodes are disposed at the centers of the hexagons in shape seen from a cross section generally parallel with the conductor layers.

Other embodiments are the capacitor according to any of the foregoing aspects, configured such that, by the gap provided between the end of at least any one of the first and second electrodes and the conductor layer, insulation is established between the electrode and the conductor layer. Alternatively, the capacitor is configured such that by an insulator provided between the end of at least any one of the first and second electrodes and the conductor layer, insulation is established between the electrode and the conductor layer. A still other embodiment is the capacitor, wherein the insulator is any of a metal oxide, a resin, and $SiO_2$. As a result, the foregoing objects are implemented.

Further, in accordance with a third aspect of the invention, there is provided a capacitor, which includes: a dielectric layer being formed of a high permittivity material, and having a prescribed thickness; a pair of generally comb-shaped surface electrodes being formed in the same main surface of the dielectric layer, and each including a plurality of linear tooth parts connected to its base part at one ends thereof; and a plurality of generally pillar-shaped internal electrodes being connected to their respective tooth parts of the pair of the surface electrodes at one ends, and extending in the direction of thickness of the dielectric layer on the other end side, and the pair of the surface electrodes being disposed on the dielectric layer surface such that the mutual tooth parts are alternately arranged in parallel via the dielectric layer. One of main embodiments thereof is the capacitor, wherein the other ends of the internal electrodes are exposed at the dielectric substance main surface opposing the surface including the surface electrodes formed therein, and an insulating layer is provided on the dielectric layer main surface. As a result, the foregoing object is implemented.

An other embodiment thereof is the capacitor according to any of the foregoing aspects, wherein the high permittivity material is any of an oxide of a valve metal, a composite oxide, and a resin. As a result, the foregoing objects are implemented.

Further, in accordance with a fourth aspect of the invention, there is provided a method for manufacturing a capacitor, which includes the steps of: anodizing a substrate of a metal, and forming a structure having gaps for filling a first electrode and a second electrode therein; forming a conductive seed-layer in one main surface of the structure; embedding a conductor in the gaps, and forming the first and second electrodes on the seed-layer; removing the structure, and filling a high permittivity material in a gap resulting therefrom to form a dielectric layer; removing the seed-layer, and forming a pair of surface electrodes or a conductor layer connected to one of the first and second electrodes, and insulated from the other on a main surface of the dielectric layer. As a result, the foregoing objects are implemented.

In accordance with an embodiment of the invention, a structure of an oxide base material including gaps for filling an electrode material therein is formed, and a first electrode and second electrodes are filled in the gaps. Then, a high permittivity material is filled in the gap part formed by removal of the oxide base material to obtain a dielectric substance (layer). Therefore, it is possible to achieve a high capacitance. Still further, the structure of the oxide base material is formed first, and then, the electrode material is filled in the gap part. This produces effects of increasing the selection of the electrode metal species, and simplifying the manufacturing process. Still further, the oxide base material is removed, and a high permittivity material is filled. Therefore, the selection of the dielectric material is enhanced, which allows the dielectric material to be changed according to the use thereof.

Further, in accordance with a fifth aspect of the invention, there is provided a method for manufacturing a capacitor, which includes: a step 1 of anodizing a substrate of a metal, and in the direction generally orthogonal to a pair of opposing main surfaces of the oxide base material, forming a plurality of holes opened at one main surface, and closed at the other main surface; a step 2 of forming a conductive seed-layer entirely over one main surface of the oxide base material; a step 3 of processing the oxide base material, and forming a plurality of generally tube-shaped structures respectively including the holes as hollow parts; a step 4 of embedding a conductor partway in a gap between the plurality of the structures, and forming a part of the first electrode on the seed-layer; a step 5 of cutting off the ends of the structures by a prescribed thickness to open the closed ends of the structures on the main surface side of the oxide base material opposing the seed-layer; a step 6 of simultaneously embedding a conductor in the gap between the plurality of the structures and the hollow parts of the structures, and forming the first electrode reaching the opening ends of the structures opened at the step 5, and second electrodes not reaching the opening ends on the seed-layer; a step 7 of removing the structures; a step 8 of filling a high permittivity material in generally tube-shaped gap parts formed by the step 7 so as to cover the end faces of the second electrodes, and to cause the end face of the first electrode to be exposed, and forming a dielectric substance; a step 9 of forming a conductor layer connected to the end face of the first electrode, and insulated from the end faces of the second electrodes on the main surface of the dielectric substance opposing the seed-layer, and removing the seed-layer; a step 10 of cutting off the end face of the first electrode by a prescribed thickness, and forming a step between the end face and an end face of the dielectric substance in the main surface from which the seed-layer has been removed; and a step 11 of forming another conductor layer connected to the end faces of the second electrodes, and insulated from the end face of the first electrode on the side opposing the conductor layer. As a result, the foregoing objects are implemented.

One of main embodiments thereof is the method for manufacturing a capacitor, which further includes a step of embedding an insulator in the step formed at the step 10 so as to cover the end face after cutting off of the first electrode, and so as to cause the end faces of the second electrodes to be exposed. A still other embodiment thereof is the method for manufacturing a capacitor, wherein in the step 1, the holes are formed so as to be situated at the apexes and the centers of hexagons forming a honeycomb structure in shape seen from a cross section generally parallel with the main surface of the base material. As a result, the foregoing objects are implemented.

Whereas, in accordance with a sixth aspect of the invention, there is provided a method for manufacturing a capacitor, which includes: a step 1 of anodizing a substrate of a metal, and forming a plurality of holes of two types different in length, and being opened at one main surface in the direction generally orthogonal to a pair of opposing main surfaces of the oxide base material, and opening the ends of the longer holes on the other main surface side of the oxide base material; a step 2 of forming a conductive seed-layer entirely over one main surface of the oxide base material; a step 3 of embedding a conductor partway in the insides of the holes opened at the step 1, and forming a part of first electrodes on the seed-layer; a step 4 of cutting off the end face of the oxide base material by a prescribed thickness on the main surface side opposing the seed-layer, and opening the closed ends of the shorter holes; a step 5 of embedding a conductor in the insides of all the plurality of the holes, and forming first electrodes reaching the end face of the oxide base material cut off in the step 4 at their end faces, and second electrodes not reaching the cut end face on the seed-layer; a step 6 of removing the oxide base material; a step 7 of filling a high permittivity material in a gap part formed between the first and second electrodes by the step 6, thereby to form a dielectric layer so as to cause the end faces of the first electrodes to be exposed, and so as to cover the end faces of the second electrodes; a step 8 of forming a conductor layer connected to the end faces of the first electrodes on the main surface of the dielectric layer opposing the seed-layer, and removing the seed-layer; a step 9 of cutting off the end faces of the first electrodes by a prescribed thickness, and forming a step between the end faces of the first electrodes and the end face of the dielectric layer in the main surface of the dielectric layer from which the seed-layer has been removed; and a step 10 of forming another conductor layer connected to the end faces of the second electrodes, and insulated from the end faces of the first electrodes on the side opposing the conductor layer. As a result, the foregoing objects are implemented.

One of main embodiments thereof is the method for manufacturing a capacitor, which further includes a step of embedding an insulator covering the end faces of the first electrodes in the step formed in the step 9. An other embodiment thereof is the method for manufacturing a capacitor, wherein in the step 1, the holes in which either ones of the first and second electrodes are embedded are disposed at apexes of hexagons forming a honeycomb structure, and the holes in which the other electrodes are embedded are disposed at centers of the hexagons in shape seen from a cross section generally parallel with the main surface of the base material. A still other embodiment thereof is the method for manufacturing a capacitor, wherein the insulator to be provided in the step is any of a metal oxide, a resin, and $SiO_2$.

Still further, in accordance with a seventh aspect of the invention, there is provided a method for manufacturing a capacitor, which includes: a step 1 of forming a pair of generally comb-shaped concave parts in each of which one end sides of a plurality of linear tooth parts are connected to a base part thereof in a main surface of a metal substrate having a prescribed thickness such that the mutual tooth parts are alternately arranged in parallel via the substrate; a step 2 of anodizing the metal substrate, and forming an oxide base material having a plurality of holes extending from the tooth parts of the concave parts in the direction of thickness of the base material; a step 3 of openings the edges of the holes formed in the oxide base material at the main surface opposite from the concave parts, and forming the seed-layer covering the opening on the oxide base material main surface; a step 4 of embedding a conductor in the insides of the holes, and forming generally pillar-shaped internal electrodes connected to the concave parts on the seed-layer; a step 5 of providing a conductor in the pair of the concave parts, forming a pair of generally comb-shaped surface electrodes, and establishing conduction through the plurality of the internal electrodes arranged along the tooth parts of respective concave parts; a step 6 of removing the oxide base material; a step 7 of filling a high permittivity material in a gap part formed at the step 6, and forming a dielectric layer; and a step 8 of removing the seed-layer. One of main embodiments thereof is the method for manufacturing a capacitor, which further includes a step of covering the main surface of the dielectric layer to be exposed after removal of the seed-layer at the step 8 with an insulator. As a result, the foregoing objects are implemented.

In accordance with an embodiment of the invention, on the surface of the oxide base material including an anodic oxide of a metal, and having a prescribed thickness, a pair of generally comb-shaped surface electrodes are formed such that the mutual tooth parts are alternately arranged in parallel at a prescribed interval. In addition, there are provided a plurality of generally pillar-shaped internal electrodes connected to the tooth parts at one ends thereof, and extending in the direction of thickness of the oxide base material on the other end side. In the gap part formed by removal of the oxide base material, a high permittivity material is filled, thereby to obtain a dielectric layer. For this reason, in addition to the foregoing effects, the effect of mutual cancelling of magnetic fields is enhanced by forming the surface electrodes in closest relation to each other on the same plane so that the current directions are opposite. This produces an effect of capable of reducing ESL.

An other embodiment thereof is the method for manufacturing a capacitor, wherein the high permittivity material is any of an oxide of a valve metal, a composite oxide, and a resin. A still other embodiment thereof is the method for manufacturing a capacitor, wherein when the high permittivity material is an oxide of a valve metal, an oxide with a higher permittivity than that of the removed structure or oxide base material is used. As a result, the foregoing objects are implemented.

Still further, in accordance with an eighth aspect of the invention, there is provided a capacitor formed by the manufacturing method according to any of the foregoing aspects. As a result, the foregoing objects are implemented.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

FIGS. 1A to 1C are views for showing Example 1 of the present invention, wherein FIG. 1A is a perspective view of an outward appearance of a capacitor element, FIG. 1B is a cross sectional view of the capacitor element cut along line #A-#A, and seen from a direction of an arrow of FIG. 1A, and FIG. 1C is a cross sectional view of the capacitor of this example, and corresponds to a cross sectional view cut along line #B-#B, and seen from a direction of an arrow of FIG. 1A;

FIGS. 2A to 2G are views each showing one example of a manufacturing step of Example 1;

FIGS. 3A to 3E are views each showing one example of a manufacturing step of Example 1;

FIGS. 4A to 4C are views each showing one example of a manufacturing step of Example 1;

FIGS. 5A and 5B are views showing Example 2 of the invention, wherein FIG. 5A is a main cross sectional view of a capacitor element, and FIG. 5B is a cross sectional view of the capacitor element cut along line #C-#C, and seen from a direction of an arrow of FIG. 5A.

FIGS. 6A to 6G are views each showing one example of a manufacturing step of Example 2;

FIGS. 7A to 7E are views each showing one example of a manufacturing step of Example 2;

FIGS. 8A to 8C are views each showing one example of a manufacturing step of Example 2;

FIGS. 9A and 9B are views showing Example 3 of the invention wherein FIG. 9A is a perspective view showing the electrode structure of a capacitor element, and FIG. 9B is a perspective view of an outward appearance of the capacitor;

FIGS. 10A to 10F are views each showing one example of a manufacturing step of Example 3; and FIGS. 11A to 11E are views each showing one example of a manufacturing step of Example 3.

DESCRIPTION OF THE PREFERRED EMBODIMENTS

Below, the present invention will be described in details by way of Examples which are not intended to limit the invention.

In the present disclosure where conditions and/or structures are not specified, the skilled artisan in the art can readily provide such conditions and/or structures, in view of the present disclosure, as a matter of routine experimentation. Further, the anodic oxidation technology disclosed in U.S. patent application Ser. No. 12/139,444, filed Jun. 13, 2008, and U.S. patent application Ser. No. 12/139,450, filed Jun. 13, 2008, by the same assignee as in the present application can be used and modified, the disclosure of which is herein incorporated by reference in their entirety.

The present invention will be explained in detail with reference to specific examples which are not intended to limit the present invention. The numerical numbers applied in specific examples may be modified by a range of at least ±50%, wherein the endpoints of the ranges may be included or excluded.

EXAMPLE 1

First, Example 1 of the invention will be described by reference to FIGS. 1A to 1C to 4A to 4C. FIG. 1A is a perspective view of the outward appearance of a capacitor element of this example. FIG. 1B is a cross sectional view of the capacitor element cut along line #A-#A, and seen from a direction of an arrow of FIG. 1A. FIG. 1C is a cross sectional view of the capacitor of this example, and corresponds to a cross sectional view cut along line #B-#B, and seen from a direction of an arrow of FIG. 1A. FIGS. 2A to 2G to 4C each show one example of a manufacturing step of this example.

A capacitor 10 of this example is configured with a capacitor element 12 as the center as shown in FIG. 1C. The capacitor element 12 includes a pair of conductor layers 14 and 16 facing each other at a prescribed distance, a plurality of generally tube-shaped dielectric substances 18, a first electrode 20 disposed between the plurality of the dielectric substances 18, and a plurality of second electrodes 24 respectively disposed in the dielectric substances 18. The dielectric substances 18 are generally orthogonal to the conductor layers 14 and 16. Such a dielectric substance 18 has a large length-to-width ratio (i.e., has a large aspect ratio), and it is formed of a high permittivity material. Whereas, one edge of the first electrode 20 is connected to the conductor layer 16, and the other edge is insulated from the conductor layer 14 via an insulation cap 28. Whereas, one edge of each second electrode 24 is connected to the conductor layer 14, and the other edge is insulated from the conductor layer 16 by each dielectric substance 18.

As the high permittivity material for forming the dielectric substance 18, there is used an oxide of a valve metal (such as Al, Ta, Nb, Ti, Zr, Hf, Zn, W, or Sb), such as $Ta_2O_5$ (25), $TiO_2$ (80), $Nb_2O_5$ (60), $ZrO_2$ (27), $HfO_2$ (25), or $Si_3N_4$ (7.4) (the figure inside the parentheses denotes the permittivity), a composite oxide such as $Ba_xSr_{1-x}TiO_3$ (300 to 1200) or $SrTiO_3$ (300), or a resin. As the conductor layers 14 and 16, there are used metals in general such as Cu, Ni, Cr, Ag, Au, Pd, Fe, Sn, Pb, Pt, Ir, Rh, Ru, and Al. Whereas, as the first electrode 20 and the second electrode 24, there are used, for example, platable metals in general such as Cu, Ni, Cr, Ag, Au, Pd, Fe, Sn, Pb, Pt, and Co, and alloys thereof. As the insulation cap 28, there is used, for example, a metal oxide or an electrodeposition resin such as polyimide, epoxy, or acrylic. The metal oxides specifically include, other than oxides of valve metals such as Al, Ta, Nb, Ti, Zr, Hf, Zn, W, and Sb, and electrodeposition $TiO_2$, composite oxides having an $ABO_3$ structure. Incidentally, the insulation cap 28 may be formed of the same material as that for the dielectric substance 18.

Whereas, an example of dimensions of each part of the capacitor element 12 is shown as follows: the distance between the conductor layer 14 and the conductor layer 16 (the length of the dielectric substance 18) is several hundreds of nanometers to several hundreds of micrometers; the thickness of the conductor layers 14 and 16 is several hundreds of nanometers to several hundreds of micrometers; the diameter of the tube-shaped dielectric substance 18 is about several tens of nanometers to several tens of micrometers for both the internal diameter and the external diameter. Whereas, the thickness of the insulation cap 28 is several tens of nanometers to several tens of micrometers; the distance of the dielectric substance 18 is several tens of nanometers to several tens of micrometers; and the thickness (external diameter—internal diameter) of the dielectric substance 18 is about several nanometers to several hundreds of micrometers.

The capacitor element 12 having the foregoing structure is entirely covered with an insulating film 30 (exterior protection material) as shown in FIG. 1C. It is connected to withdrawal parts 36 and 38 such as lead wires via connection lands 32 and 34 through openings provided at prescribed positions of the insulating film 30. Incidentally, as the insulating film 30, for example, there is used $SiO_2$, SiN, a resin, or a metal oxide.

Then, a method for manufacturing the capacitor 10 of this example will be described also by reference to FIGS. 2A to 2G to 4A to 4C. First, as shown in FIG. 2A, a metal substrate 50 including a valve metal such as Al, Ta, Nb, Ti, Zr, Hf, Zn, W, or Sb is prepared. Then, in a surface 50A of the metal substrate 50, as shown in FIG. 2B, pits 51 to be the base points for anodic oxidation are formed so as to be respectively disposed at the apexes and the centers of hexagons forming a honeycomb structure in a cross section generally orthogonal to the surface 50A. Then, as shown in FIG. 2C, a plurality of generally pillar-shaped holes 54 with the pits 51 as their respective base points are formed by anodizing. The technology of forming such holes 54 is known. In the example shown, each of the holes 54 is configured such that one edge thereof is opened at the surface 52A of the oxide base material 52, and such that the other edge is closed at a rear surface 52B of the oxide base material 52.

Then, as shown in FIG. 2D, a seed-layer 56 including a conductor is formed on the oxide base material surface 52A. In addition, the metal part of the metal substrate 50 is removed, so that the oxide base material rear surface 52B is exposed. As the seed-layer 56, there is used a metal in general such as Cu, Ni, Cr, Ag, Au, Pd, Fe, Sn, Pb, Pt, Ir, Rh, Ru, or Al. The seed-layer 56 has a function of plating seed, and a function of supporting generally tube-shaped structures 58 to be formed in the following step. Then, the interface of the oxide base material 52 is etched. Thus, as shown in FIG. 2E, on the seed-layer 56, a plurality of structures 58 each with the hole 54 as a hollow part are formed. At this step, a gap 60 is formed among a plurality of the structures 58. Then, by plating with the seed-layer 56 as a seed, as shown in FIG. 2F, a part of the first electrode 20 is formed in the gap 60. The formation of the first electrode 20 is once stopped halfway. Then, as indicated with a dotted line in FIG. 2F, a closed end face 58A of each the structures 58 is cut off by a prescribed thickness. As a result, each opened end face 58B is formed as shown in FIG. 2G.

Thereafter, subsequently, plating is performed with the seed-layer 56 as a seed, so that a plating conductor is simultaneously embedded in the gap 60 and the holes 54 which are hollow parts of the structures 58. As a result, as shown in FIG. 3A, the first electrode 20 and second electrodes 24 are formed. Embedding of the plating conductor is performed until the end face 20B of the first electrode 20 reaches the opened end face 58B of each structure 58. Incidentally, the first electrode 20 has been partially formed in advance in the foregoing step, and hence a difference in length is caused between the first electrode 20 and the second electrodes 24. Namely, embedding of the conductor is stopped at the time instant when the first electrode 20 reaches the opened end face 58B of each structure 58. This can result in the state in which the end face 24B of each second electrode 24 does not reach the opened end face 58B.

Then, with the first electrode 20 and the second electrodes 24 being left, as shown in FIG. 3B, the structures 58 including the oxide base material 52 are removed. In the gap 62, as shown in FIG. 3C, a high permittivity material is filled to form dielectric substances 18. Removal of the structures 58 is formed by, for example, etching. If the oxide base material forming the structures 58 is $Al_2O_3$, and the electrode material forming the first electrode 20 and the second electrodes 24 is Ni, processing by a NaOH solution enables removal of only $Al_2O_3$. Whereas, filling of the high permittivity material is performed by, for example, CVD or a sol-gel method. The high permittivity material is filled so as to cover the end face 24B of each second electrode 24 and to cause the end face 20B of the first electrode 20 to be exposed. Then, as shown in FIG. 3D, the seed-layer 56 is removed, and as shown in FIG. 3E, a conductor layer 16 is formed on a main surface on the side opposing the seed-layer 56. The dielectric layer 16 is in such a state as to be in connection with the end face 20B of the first electrode 20, but to be insulated from the end faces 24B of the second electrodes 24 by the presence of the end faces 18B on the rear surface side of the dielectric substances 18.

Subsequently, with the conductor layer 16 as a feeding power layer, electrolytic etching is performed. Thus, as shown in FIG. 4A, the other end face 20A of the first electrode 20 is selectively etched. As a result, a step 26 is formed between the end face 20A and the dielectric substance end face 18A. Then, for the step 26, as shown in FIG. 4B, an insulation cap 28 is formed by a technique of anodic oxidation, oxide electrodeposition, resin electrodeposition, or the like. Then, on the surface thereof, as shown in FIG. 4C, a conductor layer 14 is formed by a technique of PVD or the like. The conductor layer 14 is in such a state as to be in connection with the end faces 24A of the second electrodes 24, but to be insulated from the first electrode end face 20A by the presence of the insulation cap 28. The procedure described up to this point provides the capacitor element 12 of a concentric structure in which the conductor layer 14 is connected to the second electrodes 24 in the insides of the dielectric substances 18, and the conductor layer 16 is connected to the first electrode 20 outside the dielectric substances 18.

Thus, in accordance with Example 1, in the outside of the generally tube-shaped structures 58 including an anodic oxide of a metal, and having a high aspect ratio, the first electrode 20 is provided. Whereas, in the insides thereof, the second electrodes 24 are respectively provided. As a result, the positive electrode and the negative electrodes are formed concentrically. Then, the structures 58 are removed, and a high permittivity material is filled in the gap 62 to form the dielectric substances 18. Further, it is configured such that distribution of electrodes is performed with the first electrode 20 by the dielectric substance end face 18B provided at one edge of each second electrode 24 and each insulation cap 28. This produces the following effects.

(1) The area defining the capacitance is increased, and a high permittivity material is used. Therefore, it is possible to implement higher capacitance. For example, in the case where the structure 58 including the oxide base material 52 is $Al_2O_3$ with a permittivity of about 10, when the structure 58 is used as a capacitance material as it is, the capacitance of the capacitor 10 is defined by $Al_2O_3$. However, in this example, the material with a higher permittivity than that of the structure 58 is refilled. For this reason, it becomes possible to form the capacitor 10 exceeding in permittivity the oxide base material 52 used as a mold.

(2) It is configured such that each dielectric substance end face 18B and each insulation cap 28 are used for distribution of electrodes. Therefore, the area of the end face 20A of the first electrode 20 and the end face 24B of each second electrode 24 can also be utilized for improvement of the capacitor 10.

(3) It is configured such that, after formation of each generally cylindrical structure 58 including the oxide base material 52, the first electrode 20 and each second electrode 24 are filled in the gap 60 and each hole 54, respectively. Therefore, the selection of the electrode material is enhanced, and the manufacturing process can be simplified.

(4) It is configured such that after formation of the first electrode 20 and the second electrodes 24, the structures 58 are removed, and a high permittivity material is filled in the gap 62. Therefore, the selection of the material for the dielectric substance 18 is enhanced, and it becomes possible to change the dielectric material according to the use.

EXAMPLE 2

Then, Example 2 of the invention will be described by reference to FIGS. 5A and 5B to 8A to 8C. FIG. 5A is a main cross sectional view of a capacitor element of this example. FIG. 5B is a cross sectional view of the capacitor element cut along line #C-#C, and seen from a direction of an arrow of FIG. 5A. FIGS. 6A to 6G to 8A to 8C each show one example of a manufacturing step of this example. As shown in FIGS. 5A and 5B, a capacitor element 100 of this example is configured as follows: a dielectric layer 106 including a high permittivity material is provided between a pair of opposing conductor layers 102 and 104; and first electrodes 108 and second electrodes 110 are disposed in a plurality of holes penetrating through the dielectric layer 106.

In this example, as shown in FIG. 5B, the arrangement is configured such that the second electrodes 110 are situated at the apexes of hexagons forming a honeycomb structure, and such that the first electrodes 108 are situated at the centers of the hexagons. Then, each insulation cap 112 is formed between one end face 108A of each first electrode 108 and the conductor layer 102. Whereas, the dielectric layer 106 is present between one end face 110B of each second electrode 110 and the conductor layer 104. Thus, insulation is established between the first electrodes 108 and the second electrodes 110 and the conductor layers 102 and 104 by the insulation caps 112 and the dielectric layer 106. As a result, distribution of electrodes is performed.

Then, also by reference to FIGS. 6A to 6G to 8A to 8C, the manufacturing method of this example will be described. First, as shown in FIG. 6A, a metal substrate 120 including a valve metal is prepared. In a surface 120A of the metal substrate 120, as shown in FIG. 6B, pits 122 to be the base points for anodic oxidation are formed in a honeycomb layout. As the metal substrate 120, the same valve metals as in Example 1 are used. Then, as shown in FIG. 6C, an oxide base material 124 including a plurality of generally pillar-shaped holes 126 and 128 formed therein is obtained by anodizing. The holes 126 and 128 are formed such that each one end is opened at the surface 124A of the oxide base material 124, and such that each other end is closed at the oxide base material rear surface 124B. Incidentally, in the example shown, the holes 126 and 128 are different in length from each other. They are formed such that the shorter holes 128 are situated at the apexes of hexagons forming a honeycomb structure, and such that the longer holes 126 are situated at the centers of the hexagons.

Then, from the state shown in FIG. 6C, the metal of the metal substrate 120 is removed. In addition, as indicated with a dotted line in the same figure, the oxide base material 124 is cut off by a prescribed thickness. As shown in FIG. 6D, on the oxide base material rear surface 124B side, the closed edges of the longer holes 126 are opened. Then, as shown in FIG. 6E, on the oxide base material surface 124A, a seed-layer 130 including a conductor is formed by an appropriate technique such as PVD. Then, as shown in FIG. 6F, with the seed-layer 130 as a seed, a plating conductor is embedded partway inside each hole 126 to form a part of each first electrode 108. Upon forming a part of the first electrodes 108, embedding of the conductor is once stopped. As shown in FIG. 6G, the oxide base material rear surface 124B is cut off by a prescribed thickness, thereby to open the edges of the closed holes 128.

Thereafter, subsequently, plating is performed with the seed-layer 130 as a seed, so that a plating conductor is simultaneously embedded in the holes 126 and 128. As a result, as shown in FIG. 7A, the first electrodes 108 and second electrodes 110 are formed. Embedding of the plating conductor is performed until the end faces 108B of the first electrodes 108 reach the oxide base material rear surface 124B. Incidentally, the first electrodes 108 have been partially formed in advance in the foregoing step, and hence a difference in length is caused between the first electrodes 108 and the second electrodes 110. Namely, embedding of the conductor is stopped at the time instant when the end faces 108B of the first electrodes 108 reach the oxide base material rear surface 124B. This can result in the state in which the end faces 110B of the second electrodes 110 do not reach the oxide base material rear surface 124B.

Then, with the first electrodes 108 and the second electrodes 110 being left, as shown in FIG. 7B, the oxide base material 124 is removed. In the gap 132, as shown in FIG. 7C, a high permittivity material is filled to form a dielectric layer 106. Removal of the oxide base material 124 and filling of the high permittivity material are performed in the same manner as in Example 1 described above. The high permittivity material is filled so as to cover the end face 110B of each second electrode 110 and to cause the end face 108B of each first electrode 108 to be exposed. Then, as shown in FIG. 7D, the seed-layer 130 is removed, and as shown in FIG. 7E, a conductor layer 104 is formed on the dielectric substance rear surface 106B on the side opposing the seed-layer 130. The conductor layer 104 is in such a state as to be in connection with the end faces 108B of the first electrodes 108, but to be insulated from the end faces 110B of the second electrodes 110 by the presence of the dielectric layer 106.

Subsequently, with the conductor layer 104 as a feeding power layer, electrolytic etching is performed. Thus, as shown in FIG. 8A, the other end faces 108A of the first electrodes 108 are selectively etched. As a result, a step 134 is formed between each end face 108A and the surface 106A of the dielectric layer 106. Then, for each step 134, as shown in FIG. 8B, an insulation cap 112 is formed by a technique of anodic oxidation, oxide electrodeposition, resin electrodeposition, or the like. Then, on the surface thereof, as shown in FIG. 8C, a conductor layer 102 on the surface side is formed by an appropriate technique of PVD or the like. The conductor layer 102 is in such a state as to be in connection with the end faces 110A of the second electrodes 110, but to be insulated from the end faces 108A of the first electrodes 108 by the presence of the insulation caps 112.

The procedure described up to this point provides the capacitor element 100 of a honeycomb structure in which the conductor layer 102 is connected to the second electrodes 110 disposed at the apexes of hexagons forming a honeycomb structure, and the conductor layer 104 is connected to the first electrodes 108 disposed at the centers of the hexagons. The basic effects of this example are the same as those in Example 1 described above.

EXAMPLE 3

Then, by reference to FIGS. 9A and 9B to 11A to 11G, Example 3 of the invention will be described. FIG. 9A is a perspective view showing the electrode structure of a capacitor element of this example. FIG. 9B is a perspective view of an outward appearance of the capacitor of this example. FIGS. 10A to 10F and 11A to 11E are views each showing one example of the manufacturing step of this example. A capacitor 200 of this example includes a dielectric layer 204 having a prescribed thickness, a pair of generally comb-shaped surface electrodes 206 and 210 formed at a surface 204A of the dielectric layer 204, and a plurality of generally pillar-shaped internal electrodes 208 and 212 extending from the surface electrodes 206 and 210 toward the rear surface 204 B of the dielectric layer 204. On the dielectric layer rear surface 204B, if required, an insulator layer 214 is provided.

The dielectric layer 204 is formed of a high permittivity material. The internal electrodes 208 and 212 are formed by filling an electrode material in holes 238 (see FIG. 10C) formed in the direction of thickness of the dielectric layer 204. Such internal electrodes 208 and 212 each have a large aspect ratio (i.e., have a large aspect ratio in the z direction), and can be increased in area defining the capacitance. Further, the surface electrode 206 is configured such that one end sides of a plurality of linear tooth parts 206A arranged generally in parallel are connected to a base part 206B generally orthogonal to the tooth parts 206A. Also similarly for the other surface electrode 210, one end sides of a plurality of tooth parts 210A are connected to a base part 210B. The surface electrodes 206 and 210 are formed in the dielectric substance surface 204A so that the mutual tooth parts 206A and 210A are alternately arranged at a prescribed interval via the dielectric layer 204. The capacitor element 202 of the foregoing structure is, as shown in FIG. 9B, connected lead wires 218A, 218B, and the like via a conductor patterns 216A and 216B connected to the base parts 206B and 210B of the surface electrodes 206 and 210, respectively, and led out to the outside. Incidentally, the base parts 206B and 210B are advantageously formed with a large width, in actuality, as shown in FIG. 9B for convenience of lead-out.

As the high permittivity materials for forming the dielectric layer 204, the same materials as those in Example 1 described above are used. As the surface electrodes 206 and 210, there are used metals in general (e.g., Cu, Ni, Cr, Ag, Au, Pd, Fe, Sn, Pb, Pt, Ir, Rh, Ru, and Al). Whereas, as the internal electrodes 208 and 212, the foregoing metals in general are used. Particularly, there are used platable metals (such as Cu, Ni, Co, Cr, Ag, Au, Pd, Fe, Sn, Pb, and Pt), and alloys thereof, and the like. Whereas, as the insulator layer 214, there are used oxides of the foregoing valve metals, $SiO_2$, SiN, resins, metal oxides, and the like. As the conductor patterns 216A and 216B, metals in general are used as with the foregoing surface electrodes 206 and 210.

Whereas, the tooth parts 206A and 210A of the surface electrodes 206 and 210 are set as follows: for example, the width is several tens of nanometers to several hundreds of nanometers, the thickness is several tens of nanometers to several hundreds of nanometers, and the interval is several tens of nanometers to several hundreds of nanometers. The internal electrodes 208 and 212 are set as follows: for example, the diameter is several tens of nanometers to several hundreds of nanometers, the length is several hundreds of nanometers to several hundreds of micrometers, and the interval is several tens of nanometers to several hundreds of nanometers. Further, the thickness of the dielectric layer 204 is set at several hundreds of nanometers to several hundreds of micrometers. The thickness of the insulator layer 214 is set at about several tens of nanometers to several tens of micrometers.

Then, also by reference to FIGS. 10A to 10F and FIGS. 11A to 11E, a manufacturing method of this example will be described. First, as shown in FIG. 10A, a metal substrate 230 including a valve metal such as Al, Ta, Nb, Ti, Zr, Hf, Zn, W, or Sb is prepared. Then, in a surface 230A of the metal substrate 230, as shown in FIG. 10B, a pair of generally comb-shaped concave parts 232 and 234 are formed. The concave parts 232 and 234 include base parts 232B and 234B disposed generally in parallel at a pair of opposing edge parts of the metal substrate surface 230A, respectively, and a plurality of tooth parts 232B and 234A connected to the base parts 232B and 234B at respective one ends, respectively. The tooth parts 232A and 234A are generally orthogonal with respect to the base parts 232B and 234B. Further, the tooth parts 232A and 234A are formed so as to be alternately arranged at a prescribed interval. The concave parts 232 and 234 are formed with a depth of about several tens of nanometers to several hundreds of nanometers by, for example, etching using lithography or imprint.

When the metal substrate 230 including such concave parts 232 and 234 formed therein is subjected to anodizing under proper conditions, as shown in FIG. 10C, there is obtained an oxide base material 236 including a plurality of holes 238 with a high aspect ratio formed along the linear tooth parts 232A and 234A. Incidentally, the method for forming such holes 238 is known. When aluminum is used as the metal substrate 230, the oxide base material 236 is $Al_2O_3$. Then, the metal part of the metal substrate 230 is removed. In addition, as indicated with a dotted line in FIG. 10C, the oxide base material rear surface 236B is cut off by a prescribed thickness. As shown in FIG. 10D, the lower edges 238B of the holes 238 are opened on the oxide base material rear surface 236B side. Then, as shown in FIG. 10E, on the oxide base material rear surface 236B, a seed-layer 240 including a conductor is formed by an appropriate technique such as PVD. As the seed-layer 240, the metal part of the metal substrate 230 may be used without being removed. Alternatively, another material may be used for film formation after removal of the substrate.

Then, as shown in FIG. 10F, with the seed-layer 240 as a seed, the holes 238 are filled with a metallic material for plating, thereby to form generally pillar-shaped internal electrodes 208 and 212 in a plurality of the holes 238. The internal electrodes 208 and 212 are connected to the seed-layer 240 at the lower ends thereof, and are exposed at the bottom surfaces of the concave-shaped tooth parts 232A and 234A at the upper ends thereof. Then, as shown in FIG. 11A, a conductive material is provided in the concave parts 232 and 234, thereby to form a pair of generally comb-shaped surface electrodes 206 and 210 which have established conduction between a plurality of the tooth parts 206A and between the tooth parts 210A. This also distributes the internal electrodes 208 and 212 connected to the surface electrodes 206 and 210, respectively, into a positive electrode and a negative electrode.

Then, with the surface electrodes 206 and 210, and the internal electrodes 208 and 212 being left, as shown in FIG. 11B, the oxide base material 236 is removed. In the gap 242, as shown in FIG. 11C, a high permittivity material is filled to form a dielectric layer 204. The method for removing the oxide base material 236 and filling the high permittivity material is the same as that in Example 1 described above. Then, as shown in FIG. 11D, the seed-layer 240 is removed. If required, as shown in FIG. 11E, an insulator layer 214 is formed on the dielectric layer rear surface 204B.

Thus, in accordance with Example 3, in the surface 236A of the oxide base material 236 including an anodic oxide of a metal, a pair of generally comb-shaped surface electrodes 206 and 210 are formed so that the mutual tooth parts 206A and 210A are alternately arranged at a prescribed interval. In addition, generally pillar-shaped internal electrodes 208 and 212 extending from the tooth parts 206A and 210A in the direction of thickness of the oxide base material 236 are provided. Then, after removal of the oxide base material 236, a high permittivity material is filled in the gap 242 to form the dielectric substance 204. This produces the following effects.

(1) The area defining the capacitance is increased by forming generally pillar-shaped internal electrodes 208 and 212 extending in the direction of thickness, and a high permittivity material is used. Therefore, it is possible to implement higher capacitance of the capacitor 200.

(2) The oxide base material 236 including a plurality of generally pillar-shaped holes 238 is formed, and thereafter, the electrode material is filled in the holes 238. This simplifies the manufacturing process. Further, this increases the selection of the electrode material.

(3) It is configured such that, after removal of the oxide base material 236, a high permittivity material is filled. Therefore, the selection of the material for the dielectric layer 204 is enhanced, and it becomes possible to change the dielectric material according to the use.

(4) The surface electrodes 206 and 210 are formed in closest relation to each other on the same plane (dielectric layer surface 204A) so that the current directions are opposite. Therefore, the effect of mutual cancelling of magnetic fields is large, and ESL can be largely reduced.

Incidentally, the invention is by no way limited to the foregoing examples. Various changes may be added within the scope not departing from the gist of the invention. For example, the following are also included.

(1) The shapes and dimensions shown in the examples are one examples, and if required, they may be appropriately changed. For example, the numbers of the tooth parts 206A and 210A of the surface electrodes 206 and 210 of Example 3, and the numbers of the internal electrodes 208 and 212 are also one examples. If required, they may be appropriately increased or decreased. Two or more sets of the surface electrodes 206 and 210 may be provided on the same main surface.

(2) Also similarly for the materials, various known materials may be used. For example, as the specific example of the metal substrate for forming the structure 58, aluminum is mentioned in Example 1. However, various other known metals are applicable so long as they are metals capable of anodic oxidation.

(3) The electrode withdrawal structures shown in Examples 1 and 3 are also one examples. They may be appropriately changed in design so as to produce the same effects.

(4) The manufacturing steps shown in the examples are also one example. They may be appropriately changed so as to produce the same effects. For example, which of the front surface electrode and the rear surface electrode is formed first is also one example, and if required, it may be appropriately changed.

(5) In Example 1 described above, insulation is established by the insulation caps 28, which is also one example.

The following procedure is also acceptable. The step shown in FIG. 4B is omitted. After the step of FIG. 4A, as shown in FIG. 4C, the conductor layer 14 is provided directly, thereby to use the step 26 formed by etching in the step of FIG. 4A as an air gap. Thus, insulation between the conductor layer 14 and the first electrode 20 is established. Also similarly for Example 2, it is also acceptable that insulation is established by using the air gap, thereby to distribute electrodes.

Whereas, in Example 1 described above, the insulation caps 28 are formed by anodic oxidation, oxide electrodeposition, or resin electrodeposition. However, this is also one example, and may be appropriately changed so as to produce the same effects. For example, after the step of FIG. 4A, $SiO_2$ may be electrodeposited via the first electrode 20 exposed at the bottom part of the steps 26. Alternatively, the following procedure is also acceptable. On the electrode surface 20A, a catalyst metal such as Sn—Pd is once electrodeposited, and with this as a seed, $SiO_2$ is precipitated under no magnetic field. Alternatively, the following procedure may be accepted. A resin is coated so as to fill the steps 26, and only the resin on the surface is removed by etching or polishing. As a result, the resin is left in the steps 26. Still alternatively, the following procedure may also be acceptable. An insulator is deposited so as to embed the steps 26, and only the insulator on the surface is removed by etching or polishing. As a result, the insulator is left in the steps 26. The same also applies to Example 2.

In accordance with the invention, (1) by anodic oxidation of a metal substrate, a structure of an oxide base material including gaps for filling an electrode material is formed, and a first electrode and second electrodes are filled in the gaps. Then, a high permittivity material is filled in the gap part formed by removal of the oxide base material to obtain a dielectric substance such as a dielectric layer. Alternatively, (2) in the surface of the oxide base material having a prescribed thickness and including an anodic oxide of a metal, a pair of generally comb-shaped surface electrodes are formed so that the mutual tooth parts are alternately arranged in parallel at a prescribed interval. In addition, there are provided a plurality of generally pillar-shaped internal electrodes connected to the tooth parts at one ends thereof, and extending in the direction of thickness of the oxide base material on the other end side. In the gap part formed by removal of the oxide base material, a high permittivity material is filled, thereby to obtain a dielectric layer. For this reason, this is applicable for use of a capacitor.

The present invention includes the above mentioned embodiments and other various embodiments including the following:

1) A capacitor, comprising:

a pair of conductor layers opposing each other at a prescribed distance;

a plurality of generally tube-shaped dielectric substances being generally orthogonal to the conductor layers, and being connected at their respective opposite ends to internal main surfaces of the pair of the conductor layers, and being formed of a high permittivity material;

a first electrode being disposed between the plurality of the dielectric substances, and being connected to one conductor layer at one end thereof, and being insulated from the other conductor layer at the other end thereof; and a plurality of generally pillar-shaped second electrodes being disposed in the plurality of the dielectric substances, and being connected to the other conductor layer at respective one ends thereof, and being insulated from the one conductor layer at respective other ends thereof.

2) The capacitor according to 1), wherein the dielectric substances are disposed at apexes of hexagons forming a honeycomb structure, and centers thereof in shape seen from a cross section generally parallel with the conductor layers.

3) A capacitor, comprising:

a pair of conductor layers opposing each other at a prescribed distance;

a dielectric layer being provided between the pair of the conductor layers, and being formed of a high permittivity material;

generally pillar-shaped first electrodes being provided in some holes out of a plurality of holes penetrating through the dielectric layer in the direction generally orthogonal to the pair of the conductor layers, and being connected to the one conductor layer at respective one ends thereof, and being insulated from the other conductor layer at the other ends thereof; and generally pillar-shaped second electrodes being provided in the residual holes out of the plurality of the holes, and being connected to the other conductor layer at respective one ends thereof, and being insulated from the one conductor layer at the other ends thereof.

4) The capacitor according to 3), wherein either one electrodes of the first or second electrodes are disposed at apexes of hexagons forming a honeycomb structure, and the other electrodes are disposed at the centers of the hexagons in configuration seen from a cross section generally parallel with the conductor layers.

5). The capacitor according to any of 1) to 4), wherein by the gap provided between the end of any one of the first and second electrodes and the conductor layer, insulation is established between the electrode and the conductor layer.

6) The capacitor according to any of 1) to 4), wherein by an insulator provided between the end of any one of the first and second electrodes and the conductor layer, insulation is established between the electrode and the conductor layer.

7). The capacitor according to 6), wherein the insulator is any of a metal oxide, a resin, and $SiO_2$.

8) A capacitor, comprising:
a dielectric layer being formed of a high permittivity material, and having a prescribed thickness;
a pair of generally comb-shaped surface electrodes being formed in the same main surface of the dielectric layer, and each including a plurality of linear tooth parts connected to its base part at one ends thereof; and
a plurality of generally pillar-shaped internal electrodes being connected to their respective tooth parts of the pair of the surface electrodes at one ends, and extending in the direction of thickness of the dielectric layer on the other end side, and
the pair of the surface electrodes being disposed on the dielectric layer surface such that the mutual tooth parts are alternately arranged in parallel via the dielectric layer.

9) The capacitor according to 8), wherein the other ends of the internal electrodes are exposed at the dielectric substance main surface opposing the surface including the surface electrodes formed therein, and an insulating layer is provided on the dielectric layer main surface.

10) The capacitor according to any of 1) to 9), wherein the high permittivity material is any of an oxide of a valve metal, a composite oxide, and a resin.

11) A method for manufacturing a capacitor, comprising the steps of:
anodizing a substrate of a metal, and forming a structure having gaps for filling a first electrode and a second electrode therein;
forming a conductive seed-layer in one main surface of the structure;
embedding a conductor in the gaps, and forming the first and second electrodes on the seed-layer;
removing the structure, and filling a high permittivity material in a gap resulting therefrom to form a dielectric layer; and
removing the seed-layer, and forming a pair of surface electrodes or a conductor layer connected to one of the first and second electrodes, and insulated from the other on a main surface of the dielectric layer.

12) A method for manufacturing a capacitor, comprising:
a step 1 of anodizing a substrate of a metal, and in the direction generally orthogonal to a pair of opposing main surfaces of the oxide base material, forming a plurality of holes opened at one main surface, and closed at the other main surface;
a step 2 of forming a conductive seed-layer entirely over one main surface of the oxide base material;
a step 3 of processing the oxide base material, and forming a plurality of generally tube-shaped structures respectively including the holes as hollow parts;
a step 4 of embedding a conductor partway in a gap between the plurality of the structures, and forming a part of the first electrode on the seed-layer;
a step 5 of cutting off the ends of the structures by a prescribed thickness to open the closed ends of the structures on the main surface side of the oxide base material opposing the seed-layer;
a step 6 of simultaneously embedding a conductor in the gap between the plurality of the structures and the hollow parts of the structures, and forming the first electrode reaching the opening ends of the structures opened at the step 5, and second electrodes not reaching the opening ends on the seed-layer;
a step 7 of removing the structures;
a step 8 of filling a high permittivity material in generally tube-shaped gap parts formed by the step 7 so as to cover the end faces of the second electrodes, and to cause the end face of the first electrode to be exposed, and forming a dielectric substance;
a step 9 of forming a conductor layer connected to the end face of the first electrode, and insulated from the end faces of the second electrodes on the main surface of the dielectric substance opposing the seed-layer, and removing the seed-layer;
a step 10 of cutting off the end face of the first electrode by a prescribed thickness, and forming a step between the end face and an end face of the dielectric substance in the main surface from which the seed-layer has been removed; and
a step 11 of forming another conductor layer connected to the end faces of the second electrodes, and insulated from the end face of the first electrode on the side opposing the conductor layer.

13) The method for manufacturing a capacitor according to 12), further comprising a step of embedding an insulator in the step formed at the step 10 so as to cover the end face after cutting off of the first electrode, and so as to cause the end faces of the second electrodes to be exposed.

14) The method for manufacturing a capacitor according to 12) or 13), wherein in the step 1, the holes are formed so as to be situated at the apexes and the centers of hexagons forming a honeycomb structure in shape seen from across section generally parallel with the main surface of the base material.

15) A method for manufacturing a capacitor, comprising:
a step 1 of anodizing a substrate of a metal, and forming a plurality of holes of two types different in length, and being opened at one main surface in the direction generally orthogonal to a pair of opposing main surfaces of the oxide base material, and opening the ends of the longer holes on the other main surface side of the oxide base material;
a step 2 of forming a conductive seed-layer entirely over one main surface of the oxide base material;
a step 3 of embedding a conductor partway in the insides of the holes opened at the step 1, and forming a part of first electrodes on the seed-layer;
a step 4 of cutting off the end face of the oxide base material by a prescribed thickness on the main surface side opposing the seed-layer, and opening the closed ends of the shorter holes;

a step 5 of embedding a conductor in the insides of all the plurality of the holes, and forming first electrodes reaching the end face of the oxide base material cut off in the step 4 at their end faces, and second electrodes not reaching the cut end face on the seed-layer;

a step 6 of removing the oxide base material;

a step 7 of filling a high permittivity material in a gap part formed between the first and second electrodes by the step 6, thereby to form a dielectric layer so as to cause the end faces of the first electrodes to be exposed, and so as to cover the end faces of the second electrodes;

a step 8 of forming a conductor layer connected to the end faces of the first electrodes on the main surface of the dielectric layer opposing the seed-layer, and removing the seed-layer;

a step 9 of cutting off the end faces of the first electrodes by a prescribed thickness, and forming a step between the end faces of the first electrodes and the end face of the dielectric layer in the main surface of the dielectric layer from which the seed-layer has been removed; and a step 10 of forming another conductor layer connected to the end faces of the second electrodes, and insulated from the end faces of the first electrodes on the side opposing the conductor layer.

16) The method for manufacturing a capacitor according to 15), further comprising a step of embedding an insulator covering the end faces of the first electrodes in the step formed in the step 9.

17) The method for manufacturing a capacitor according to 15) or 16), wherein in the step 1, the holes in which either ones of the first and second electrodes are embedded are disposed at apexes of hexagons forming a honeycomb structure, and the holes in which the other electrodes are embedded are disposed at centers of the hexagons in shape seen from a cross section generally parallel with the main surface of the base material.

18) The method for manufacturing a capacitor according to 13) or 16), wherein the insulator to be provided in the step is any of a metal oxide, a resin, and $SiO_2$.

19) A method for manufacturing a capacitor, comprising:

a step 1 of forming a pair of generally comb-shaped concave parts in each of which one end sides of a plurality of linear tooth parts are connected to a base part thereof in a main surface of a metal substrate having a prescribed thickness such that the mutual tooth parts are alternately arranged in parallel via the substrate;

a step 2 of anodizing the metal substrate, and forming an oxide base material having a plurality of holes extending from the tooth parts of the concave parts in the direction of thickness of the base material;

a step 3 of opening the edges of the holes formed in the oxide base material at the main surface opposite from the concave parts, and forming the seed-layer covering the openings on the oxide base material main surface;

a step 4 of embedding a conductor in the insides of the holes, and forming generally pillar-shaped internal electrodes connected to the concave parts on the seed-layer;

a step 5 of providing a conductor in the pair of the concave parts, forming a pair of generally comb-shaped surface electrodes, and establishing conduction through the plurality of the internal electrodes arranged along the tooth parts of respective concave parts;

a step 6 of removing the oxide base material;

a step 7 of filling a high permittivity material in a gap part formed at the step 6, and forming a dielectric layer; and a step 8 of removing the seed-layer.

20) The method for manufacturing a capacitor according to 19), further comprising a step of covering the main surface of the dielectric layer to be exposed after removal of the seed-layer at the step 8 with an insulator.

21) The method for manufacturing a capacitor according to any of 11) to 20), wherein the high permittivity material is any of an oxide of a valve metal, a composite oxide, and a resin.

22) The method for manufacturing a capacitor according to 21), wherein when the high permittivity material is an oxide of a valve metal, an oxide with a higher permittivity than that of the removed structure or oxide base material is used.

23) A capacitor, being formed by the manufacturing method according to any of 11) to 22).

The present application claims priority to Japanese Patent Application No. 2007-214202, filed Aug. 20, 2007, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A capacitor, comprising:
a pair of conductor layers opposing each other at a prescribed distance;
a plurality of substantially or nearly tube-shaped dielectric substances being substantially or nearly orthogonal to the conductor layers, and being connected at their respective opposite ends to internal main surfaces of the pair of conductor layers, and being formed of a high permittivity material;
a first electrode being disposed between the plurality of the dielectric substances, surrounding each dielectric substrate, and being connected to one of the conductor layers at one end of the first electrode, and being insulated from another of the conductor layers at another end of the first electrode; and
a plurality of substantially or nearly pillar-shaped second electrodes being disposed inside the plurality of the dielectric substances, respectively, and being connected to the another conductor layer at respective one ends of the second electrodes, and being insulated from the one conductor layer at respective another ends of the second electrode.

2. The capacitor according to claim 1, wherein the dielectric substances are disposed at apexes of hexagons forming a honeycomb structure, and centers thereof as viewed from a cross section substantially or nearly parallel with the conductor layers.

3. The capacitor according to claim 1, wherein the first and second electrodes are insulated from the corresponding conductor layers by a gap provided between the end of each of the first and second electrodes and the corresponding conductor layer.

4. The capacitor according to claim 1, wherein the first and second electrodes are insulated from the corresponding conductor layers by an insulator provided between the end of each of the first and second electrodes and the corresponding conductor layer.

5. The capacitor according to claim 4, wherein the insulator is made of a metal oxide, a resin, or $SiO_2$.

6. The capacitor according to claim 1, wherein the high permittivity material is an oxide of a valve metal, a composite oxide, or a resin.

7. The capacitor according to claim 1, wherein the dielectric substances are made of an anodic oxidation substance.

8. A capacitor, comprising:
a pair of conductor layers opposing each other at a given distance;
a dielectric layer being provided between the pair of conductor layers, and being formed of a high permittivity material, wherein a plurality of holes penetrate through the dielectric layer in a direction substantially or nearly orthogonal to the pair of conductor layers;
substantially or nearly pillar-shaped first electrodes being provided in some of the holes, and being connected to one of the conductor layers at respective one ends of the first electrodes, and being insulated from another of the conductor layers at respective another ends of the first electrodes; and
substantially or nearly pillar-shaped second electrodes being provided in residuals of the holes, and being connected to the another conductor layer at respective one ends of the second electrodes, and being insulated from the one conductor layer at respective another ends of the second electrodes.

9. The capacitor according to claim 8, wherein either one electrodes of the first or second electrodes are disposed at apexes of hexagons forming a honeycomb structure, and the other electrodes are disposed at centers of the hexagons, as viewed from a cross section substantially or nearly parallel with the conductor layers.

10. The capacitor according to claim 8, wherein the first and second electrodes are insulated from the corresponding conductor layers by a gap provided between the end of each of the first and second electrodes and the corresponding conductor layer.

11. The capacitor according to claim 8, wherein the first and second electrodes are insulated from the corresponding conductor layers by an insulator provided between the end of each of the first and second electrodes and the corresponding conductor layer.

12. The capacitor according to claim 11, wherein the insulator is made of a metal oxide, a resin, or $SiO_2$.

13. The capacitor according to claim 8, wherein the high permittivity material is an oxide of a valve metal, a composite oxide, or a resin.

14. The capacitor according to claim 8, wherein the dielectric layer is made of an anodic oxidation substance.

15. A capacitor, comprising:
a dielectric layer being formed of a high permittivity material, and having a given thickness;
a pair of substantially or nearly comb-shaped surface electrodes being formed in the same main surface of the dielectric layer, and each electrode including a base part and a plurality of linear tooth parts connected to the base part at one ends thereof; and
a plurality of substantially or nearly pillar-shaped internal electrodes being connected to the respective tooth parts of the pair of surface electrodes at respective one ends of the internal electrodes, and extending from the one ends in a direction of thickness of the dielectric layer toward another main surface of the dielectric layer, and
the pair of surface electrodes being disposed on the same main surface of the dielectric layer surface such that the respective tooth parts of one of the surface electrodes and the respective tooth parts of another of the surface electrodes are alternately arranged in parallel in a direction and separated via a part of the dielectric layer.

16. The capacitor according to claim 15, wherein respective another ends of the internal electrodes are exposed at the another main surface of the dielectric layer opposing the surface including the surface electrodes formed therein, and an insulating layer is provided on the another main surface of the dielectric layer.

17. The capacitor according to claim 15, wherein the high permittivity material is an oxide of a valve metal, a composite oxide, or a resin.

18. The capacitor according to claim 15, wherein the dielectric layer is made of an anodic oxidation substance.

* * * * *